(12) United States Patent
Zhang et al.

(10) Patent No.: US 11,663,224 B2
(45) Date of Patent: May 30, 2023

(54) PROCESSING QUERIES USING AN ATTENTION-BASED RANKING SYSTEM

(71) Applicant: Microsoft Technology Licensing, LLC, Redmond, WA (US)

(72) Inventors: Chiqun Zhang, Sunnyvale, CA (US); Michael Robert Evans, Seattle, WA (US); Maksim Lepikhin, Boulder, CO (US); Dragomir Dimitrov Yankov, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

(21) Appl. No.: 17/187,449

(22) Filed: Feb. 26, 2021

(65) Prior Publication Data

US 2022/0277015 A1    Sep. 1, 2022

(51) Int. Cl.
| | |
|---|---|
| *G06F 16/338* | (2019.01) |
| *G06F 16/387* | (2019.01) |
| *G06F 16/2457* | (2019.01) |
| *G06F 16/903* | (2019.01) |
| *G06N 3/045* | (2023.01) |

(52) U.S. Cl.
CPC ...... *G06F 16/24578* (2019.01); *G06F 16/338* (2019.01); *G06F 16/90344* (2019.01); *G06N 3/045* (2023.01); *G06F 16/387* (2019.01)

(58) Field of Classification Search
CPC ............. G06F 16/90344; G06F 16/338; G06F 16/24578; G06F 16/248; G06F 16/29; G06F 16/9038
See application file for complete search history.

(56) References Cited

U.S. PATENT DOCUMENTS

| | | | |
|---|---|---|---|
| 8,407,211 B1 * | 3/2013 | Lewis ............... | G06F 16/24578 707/706 |
| 8,589,069 B1 * | 11/2013 | Lehman .................. | H04W 4/02 340/995.14 |
| 10,642,887 B2 | 5/2020 | Chen et al. | |

(Continued)

OTHER PUBLICATIONS

PCT Search Report and Written Opinion for PCT/US2022/016910, dated May 2022, 9 pages.

(Continued)

*Primary Examiner* — Robert W Beausoliel, Jr.
*Assistant Examiner* — Pedro J Santos

(57) ABSTRACT

Technology is described herein for ranking candidate result items in at least two stages. In a first stage, the technology uses a first attention-based neural network to determine an extent of attention that each token of an input query should pay to the tokens of each candidate result item. In a second stage, the technology uses a ranking subsystem to perform listwise inference on output results provided by the first stage, to generate a plurality of ranking scores that establish an order of relevance of the candidate results items. The ranking subsystem may use a second attention-based neural network to perform the listwise inference. According to some implementations, the technology is configured to process queries and candidate result items having different kinds and combinations of features. For instance, one kind of input query may include text-based features, structure-based features, and geographic-based features.

25 Claims, 9 Drawing Sheets

(56) References Cited

U.S. PATENT DOCUMENTS

| | | | |
|---|---|---|---|
| 11,062,368 B1* | 7/2021 | Setchell | H04W 4/02 |
| 2013/0110822 A1* | 5/2013 | Ikeda | G06F 16/248 |
| | | | 707/E17.082 |
| 2015/0242419 A1* | 8/2015 | Holmquist | G06F 16/9537 |
| | | | 707/706 |
| 2015/0278211 A1* | 10/2015 | Voronel | G01C 21/3676 |
| | | | 707/728 |
| 2016/0004725 A1* | 1/2016 | Liu | G06F 16/29 |
| | | | 707/724 |
| 2018/0181592 A1* | 6/2018 | Chen | G06F 16/5866 |
| 2018/0365220 A1 | 12/2018 | Chakraborty et al. | |

OTHER PUBLICATIONS

Ai, et al., "Learning Groupwise Multivariate Scoring Functions Using Deep Neural Networks," in Proceedings of the 2019 ACM SIGIR International Conference on Theory of Information Retrieval, Sep. 2019, pp. 85-92.

Berkhin, et al., "A New Approach to Geocoding: BingGC," in SIGSPATIAL '15: Proceedings of the 23rd SIGSPATIAL International Conference on Advances in Geographic Information Systems, Article No. 7, Nov. 2015, 10 pages.

Brown, et al., "Language Models are Few-Shot Learners," arXiv:2005.14165v4 [cs.CL], Jul. 22, 2020, 75 pages.

Burges, et al., "Learning to Rank using Gradient Descent," in ICML '05: Proceedings of the 22nd International Conference on Machine Learning, Aug. 2005, 8 pages.

Burges, et al., "From RankNet to LambdaRank to LambdaMART: An Overview," available at https://www.microsoft.com/en-us/research/uploads/prod/2016/02/MSR-TR-2010-82.pdf, Microsoft Research Technical Report, MSR-TR-2010-82, Jun. 2010, 19 pages.

Burges, et al., "Learning to Rank with Nonsmooth Cost Functions," in NIPS'06: Proceedings of the 19th International Conference on Neural Information Processing Systems, Dec. 2006, 8 pages.

Zhao, et al., "Integrating Transformer and Paraphrase Rules for Sentence Simplification," arXiv:1810.11193v1 [cs.CL], Oct. 26, 2018, 10 pages.

Cooper, et al., "Probabilistic Retrieval Based on Staged Logistic Regression," in SIGIR '92: Proceedings of the 15th Annual International ACM SIGIR Conference on Research and Development in Information Retrieval, Jun. 1992, pp. 198-210.

Craig, et al., "Scaling Address Parsing Sequence Models through Active Learning," in SIGSPATIAL '19: Proceedings of the 27th ACM SIGSPATIAL International Conference on Advances in Geographic Information Systems, Nov. 2019, 4 pages.

Dan, et al., "IP Geolocation through Reverse DNS," arXiv:1811.04288v1 [cs.NI], Nov. 10, 2018, 10 pages.

Devlin, et al., "BERT: Pre-training of Deep Bidirectional Transformers for Language Understanding," in arXiv:1810.04805v2 [cs.CL], May 24, 2019, 16 pages.

Gao, et al., "Modularized Transformer-based Ranking Framework," in Proceedings of the 2020 Conference on Empirical Methods in Natural Language Processing (EMNLP), Nov. 2020, pp. 4180-4190.

Gao, et al., "Understanding BERT Rankers Under Distillation," in ICTIR '20: Proceedings of the 2020 ACM SIGIR on International Conference on Theory of Information Retrieval, Sep. 2020, pp. 149-152.

Goldberg, et al., "From Text to Geographic Coordinates: The Current State of Geocoding," in URISA Journal, vol. 19, No. 1, 2007, pp. 33-46.

Guo, et al., "A Deep Relevance Matching Model for Ad-hoc Retrieval," in CIKM '16: Proceedings of the 25th ACM International on Conference on Information and Knowledge Management, Oct. 2016, pp. 55-64.

Haldar, et al., "Applying Deep Learning to Airbnb Search," in KDD '19: Proceedings of the 25th ACM SIGKDD International Conference on Knowledge Discovery & Data Mining, Jul. 2019, pp. 1927-1935.

Han, et al., "Learning-to-Rank with BERT in TF-Ranking," arXiv:2004.08476v3 [cs.IR], Jun. 8, 2020, 6 pages.

Haspel, et al., "Location, Location, Location: Precinct Placement and the Costs of Voting," in Journal of Politics, vol. 67, No. 2, May 2005, pp. 560-573.

Huang, et al., "Learning Deep Structured Semantic Models for Web Search using Clickthrough Data," in CIKM '13: Proceedings of the 22nd ACM International Conference on Information & Knowledge Management, Oct. 2013, pp. 2333-2338.

Joachims, Thorsten, "Optimizing Search Engines using Clickthrough Data," in KDD '02: Proceedings of the Eighth ACM SIGKDD International Conference on Knowledge Discovery and Data Mining, Jul. 2002, pp. 133-142.

Karimi, Hassan A. (ed.). Advanced Location-Based Technologies and Services, CRC Press, Taylor & Francis Group, 2013, 355 pages (submitted in six parts).

Ke, et al., "LightGBM: A Highly Efficient Gradient Boosting Decision Tree," in Advances in Neural Information Processing Systems 30 (NIPS 2017), 2017, 9 pages.

Li, et al., "McRank: Learning to Rank Using Multiple Classification and Gradient Boosting," in Advances in Neural Information Processing Systems 20 (NIPS 2007), 2007, 8 pages.

Mitra, et al., "An Introduction to Neural Information Retrieval," in Foundations and Trends in Information Retrieval, vol. 13(1), Dec. 2018, 126 pages.

Kumar, et al., "TF-Ranking: Scalable TensorFlow Library for Learning-to-Rank," in KDD '19: Proceedings of the 25th ACM SIGKDD International Conference on Knowledge Discovery & Data Mining, Jul. 2019, pp. 2970-2978.

Kumar, et al., "Self-Attentive Document Interaction Networks for Permutation Equivariant Ranking," arXiv:1910.09676v2 [cs.IR], Oct. 23, 2019, 8 pages.

Pfannschmidt, et al., "Deep Architectures for Learning Context-dependent Ranking Functions," arXiv:1803.05796v2 [stat.ML], Dec. 6, 2018, 14 pages.

Pobrotyn, et al., "Context-Aware Learning to Rank with Self-Attention," arXiv:2005.10084v3 [cs.IR], Jul. 28, 2020, 8 pages.

Qiao, et al., "Understanding the Behaviors of BERT in Ranking," arXiv:1904.07531v4 [cs.IR], Apr. 26, 2019, 4 pages.

Radford, et al., "Language Models are Unsupervised Multitask Learners," available at https://cdn.openai.com/better-language-models/language_models_are_unsupervised_multitask_learners.pdf, OpenAI blog, 2019, 24 pages.

Bengar, et al., "Robust Location Search from Text Queries," in GIS '07: Proceedings of the 15th Annual ACM International Symposium on Advances in Geographic Information Systems, Nov. 2007, Article No. 24, 8 pages.

Vaswani, et al., "Attention is All you Need," in Advances in Neural Information Processing Systems 30 (NIPS 2017), 2017, 11 pages.

Vine, et al., "Geographic Information Systems: Their Use in Environmental Epidemiologic Research," in Environmental Health Perspectives, vol. 105, No. 6, Jun. 1997, pp. 598-605.

Viola, et al., "Learning to Extract Information from Semi-structured Text using a Discriminative Context Free Grammar," in SIGIR '05: Proceedings of the 28th Annual International ACM SIGIR Conference on Research and Development in Information Retrieval, Aug. 2005, pp. 330-337.

Wu, et al., "Adapting Boosting for Information Retrieval Measures," in Information Retrieval, vol. 13, Jun. 2010, 17 pages.

Yin, et al., "A deep learning approach for rooftop geocoding," in Transactions in GIS, vol. 23, No. 3, Jun. 2019, pp. 495-514.

Zandbergen., Paul A., "Geocoding Quality and Implications for Spatial Analysis," in Geography Compass, vol. 3, No. 2, Mar. 2009, pp. 647-680.

Alammar, Jay, "The Illustrated Transformer," available at http://jalammar.github.io/illustrated-transformer/, Github, accessed on Feb. 16, 2021, 23 pages.

"Learning to rank," available at https://en.wikipedia.org/wiki/Learning_to_rank, Wikipedia article, accessed on Feb. 15, 2021, 12 pages.

"Discounted cumulative gain," available at https://en.wikipedia.org/wiki/Discounted_cumulative_gain, Wikipedia article, accessed on Feb. 15, 2021, 5 pages.

(56) References Cited

OTHER PUBLICATIONS

Dan, et al., "Improving IP Geolocation using Query Logs," in WSDM '16: Proceedings of the Ninth ACM International Conference on Web Search and Data Mining, Feb. 2016, pp. 347-356.
Dan, Ovidiu, "IP Geolocation," Ph.D. Dissertation, Lehigh University, May 2019, 238 pages.
Al, et al., "Learning a Deep Listwise Context Model for Ranking Refinement," in SIGIR '18: The 41st International ACM SIGIR Conference on Research & Development in Information, Jun. 2018, pp. 135-144.
Bruch, et al., "An Analysis of the Softmax Cross Entropy Loss for Learning-to-Rank with Binary Relevance," in ICTIR 19: Proceedings of the 2019 ACM SIGIR International Conference on Theory of Information, Sep. 2019, pp. 75-78.
Chapelle, et al., "Yahoo! Learning to Rank Challenge Overview," in YLRC'10: Proceedings of the 2010 International Conference on Yahoo! Learning to Rank Challenge, vol. 14, Jun. 2010, 24 pages.
Bello, et al., "Seq2Slate: Re-ranking and Slate Optimization with RNNs," arXiv:1810.02019v3 [cs.IR], Mar. 19, 2019, 21 pages.
Lewis, et al., "BART: Denoising Sequence-to-Sequence Pre-training for Natural Language GenerationTranslation, and Comprehension," arXiv:1910.13461v1 [cs.CL], Oct. 29, 2019, 10 pages.
Padigela, et al., "Investigating the Successes and Failures of BERT for Passage Re-Ranking," arXiv:1905.01758v1 [cs.IR], May 5, 2019, 5 pages.
Nogueira, et al., "Passage Re-ranking with BERT," arXiv:1901.04085v5 [cs.IR], Apr. 14, 2020, 5 pages.
Zhang, et al., "Fast Attention-based Learning-To-Rank Model for Structured Map Search," in SIGIR '21: Proceedings of the 44th International ACM SIGIR Conference on Research and Development in Information Retrieval, Jul. 2021, pp. 942-951.

\* cited by examiner

OVERVIEW OF OPERATION OF THE RANKING SYSTEM 702

OBTAIN THE QUERY AND THE PLURALITY OF CANDIDATE RESULT ITEMS THAT MATCH THE QUERY, THE QUERY HAVING ONE OR MORE TOKENS, AND EACH CANDIDATE RESULT ITEM HAVING ONE OR MORE TOKENS.
704

GENERATE, USING A FIRST ATTENTION-BASED NEURAL NETWORK, A PLURALITY OF INSTANCES OF QUERY-TO-RESULT SIMILARITY INFORMATION RESPECTIVELY CORRESPONDING TO THE PLURALITY OF CANDIDATE RESULT ITEMS, EACH INSTANCE OF QUERY-TO-RESULT SIMILARITY INFORMATION EXPRESSING AN EXTENT OF ATTENTION THAT EACH TOKEN OF THE QUERY SHOULD PAY TO EACH TOKEN OF A PARTICULAR CANDIDATE RESULT ITEM.
706

GENERATE, USING A RANKING SUBSYSTEM, PLURAL RANKING SCORES BASED ON THE PLURALITY OF INSTANCES OF QUERY-TO-RESULT INFORMATION, THE PLURAL RANKING SCORES IDENTIFYING AN ORDER OF RELEVANCE OF THE PLURALITY OF CANDIDATE RESULT ITEMS TO THE QUERY.
708

IDENTIFY AT LEAST A TOP-RANKING CANDIDATE RESULT ITEM TO BE PRESENTED TO A USER BASED ON THE PLURAL SCORES.
710

FIG. 7

OVERVIEW OF OPERATION OF THE RANKING SUBSYSTEM 802

COMBINE THE PLURALITY OF INSTANCES OF ORIGINAL QUERY-TO-RESULT SIMILARITY INFORMATION WITH SUPPLEMENTAL FEATURE INFORMATION PERTAINING TO THE QUERY, TO GENERATE A PLURALITY OF RESPECTIVE INSTANCES OF ENHANCED SIMILARITY INFORMATION.
804

GENERATE, USING A SECOND ATTENTION-BASED NEURAL NETWORK, A PLURALITY OF INSTANCES OF RESULT-TO-RESULT CONTEXT INFORMATION USING SELF-ATTENTION, EACH INSTANCE OF RESULT-TO-RESULT CONTEXT INFORMATION EXPRESSING AN EXTENT OF ATTENTION THAT A PARTICULAR INSTANCE OF ENHANCED SIMILARITY INFORMATION SHOULD PAY TO OTHER INSTANCES OF ENHANCED SIMILARITY INFORMATION.
806

MAP, USING A SCORING NEURAL NETWORK, THE PLURALITY OF INSTANCES OF RESULT-TO-RESULT CONTEXT INFORMATION INTO THE PLURAL RESPECTIVE RANKING SCORES.
808

FIG. 8

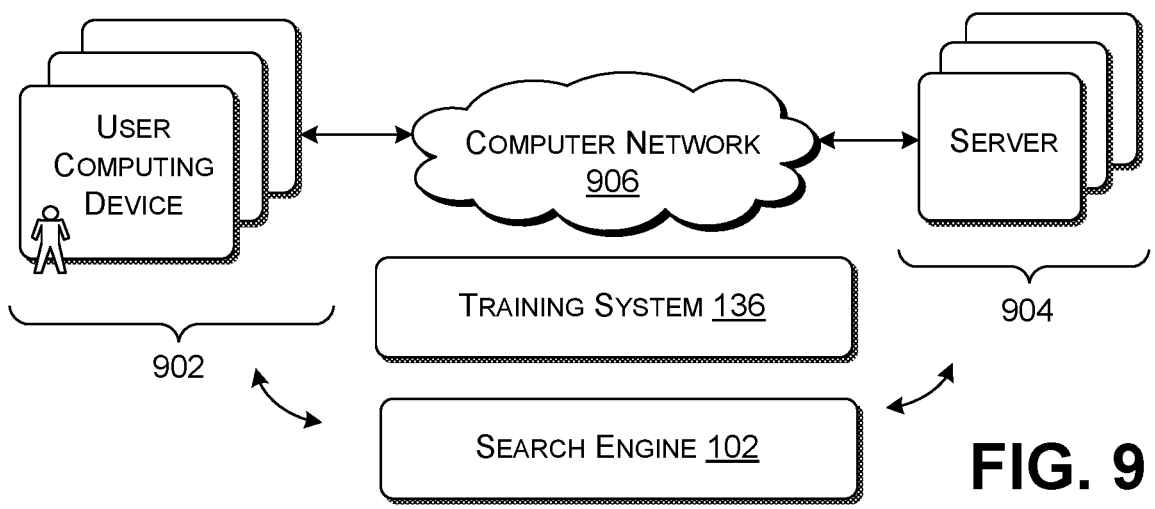

FIG. 9

PROCESSING QUERIES USING AN ATTENTION-BASED RANKING SYSTEM

BACKGROUND

Some search engines respond to user queries using a process that employs a pipeline of stages. In one stage, a search engine identifies a group of candidate documents that match a user's query. In a subsequent stage, the search engine uses a ranking system to order (or re-order) the candidate documents based on their assessed relevance to the query. A ranking system may perform its task using a machine-trained model. While such a model may increase the accuracy of the ranking system's output results, its development and use may also pose technical challenges.

SUMMARY

Technology is described herein for ranking candidate result items in at least two stages. In a first stage, the technology uses a first attention-based neural network to determine an amount of attention that each token of an input query should pay to the tokens of each candidate result item. A token refers to any part of an identified piece of text. In the case of a query, for instance, a query token may correspond to a word in the query, a fragment of a word, etc., and/or any information derived from the word or fragment, etc. In a second stage, the technology uses a ranking subsystem to perform listwise inference on output results provided by the first stage, to produce a plurality of ranking scores. The ranking scores establish an order of relevance of the candidate results items.

According to some implementations, the ranking subsystem uses a second attention-based neural network to perform the listwise inference. The second attention-based neural network uses self-attention on the output results provided by the first attention-based neural network.

According to some implementations, the ranking subsystem uses a scoring neural network to process output results provided by the second attention-based neural network. The scoring neural network produces the plurality of ranking scores.

According to some implementations, the technology is configured to process queries and candidate result items associated with different kinds and combinations of features. For instance, a query may include any combination of text-based features, structure-based features, geographical-based features, etc. In some implementations, the first attention-based neural network operates based on a first set of features, while the second attention-based neural network and the scoring neural network operate on an expanded set of features. In some implementations, the expanded set of features specifically includes features that convey the geographical context of a query (which is omitted in the processing performed by the first attention-based neural network).

The technology has beneficial technical characteristics. For instance, according to one technical merit, the technology can eliminate or reduce the use of manually-crafted features which are common in other learning to rank (LTR) models. According to another technical merit, the technology can generate the ranking scores in a single pass. This aspect enables the technology to efficiently consume computing resources and quickly produce its output results. According to another technical merit, the technology offers a ranking solution that can be applied to many different environments and many different kinds of queries with reduced (or no) modification of its code. This aspect contributes to the flexibility and scalability of the technology. For instance, insofar as the technology can process diverse queries (from the standpoint of their feature-space composition), the technology provides a solution that is more universal in its application than other systems. These possible technical benefits are mentioned here in the spirit of illustration, not limitation; the technology may offer yet other benefits.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 is a flowchart that shows a process that explains one manner of operation of the ranking system of FIGS. 1 and 2.

FIG. 8 is a flowchart that shows a process that explains one manner of operation of the ranking subsystem of FIGS. 1 and 2.

FIG. 9 shows computing equipment that can be used to implement the systems shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a ranking system for ranking candidate result items in response to the submission of a query, where the query may be described by different kinds and combinations of features. Section B sets forth illustrative methods which explain the operation of the ranking system of Section A. And Section C describes illustrative computing functionality that can be used to implement any aspect of the features described in Sections A and B.

A. Illustrative Ranking System

A developer will typically use a machine-trained model in a ranking system to increase the accuracy of its results. But the use of traditional machine-trained models may also impose a cost. For instance, some traditional ranking systems require the use of hand-crafted features, making them difficult to develop and maintain. This is true, for instance, in the case of gradient-boosted decisions trees (GBDT). In addition, or alternatively, some traditional ranking systems consume a relatively large amount of computing resources and/or impose significant latency-related costs. In addition, or alternatively, some traditional ranking systems are developed to serve a relatively narrow field of use, and cannot easily be adapted to new environments. For example, some traditional ranking systems are developed to exclusively process text-based queries and text-based candidate result items. These drawbacks are mentioned here in the spirit of illustration, not limitation; traditional ranking systems may suffer from yet other drawbacks.

Figure 1:
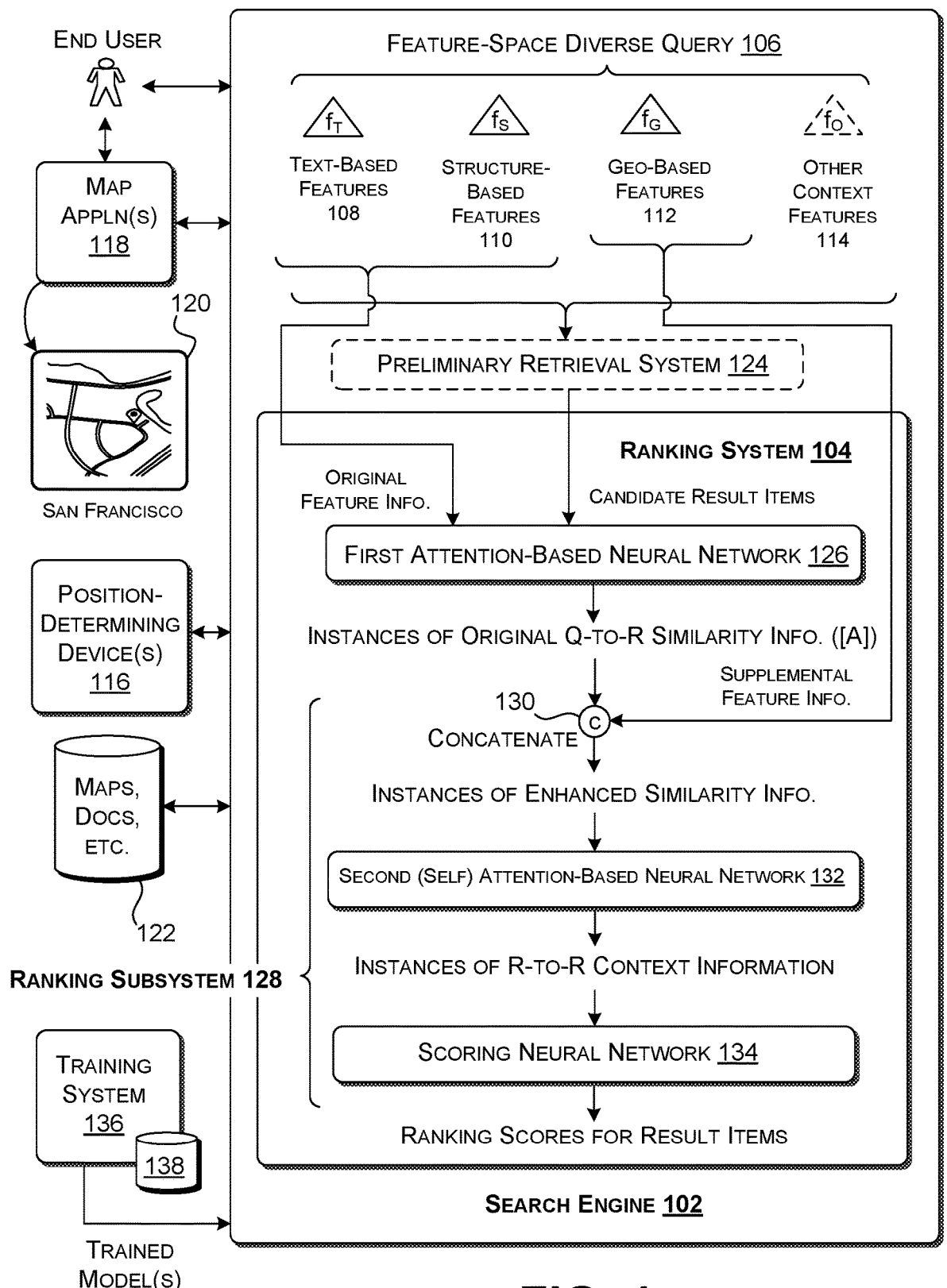
FIG. 1 shows an overview of a search engine that includes an attention-based ranking system.

FIG. 1 provides an overview of a search engine 102 that includes a ranking system 104 that presents a solution to one or more of the above-noted technical problems. In some contexts, the search engine 102 receives a query from an end user ("user") that may be composed of one or more search terms. For instance, the user may submit the query via a browser application installed on a user computing device or through some other application interface. The search engine 102 identifies one or more result items that match the query. The search engine 102 can notify the user of the result item(s) via a results page, e.g., as a ranked list of result snippets. In other contexts, the search engine 102 may receive context signals that describe the user's current situation without necessarily receiving a text-based query explicitly input by the user. For instance, the context signals can identify a web page that the user is currently viewing. The search engine 102 finds one or more result items that match the context signals. The search engine 102 can notify the user of these result item(s) in different ways, e.g., via advertisements or product suggestions in the margin of the page that the user is currently viewing. For this reason, what is referred to herein as a "search engine" is intended to encompass technology that is primarily used to provide recommendations to users in any context.

With the above points in mind, a "query" refers to any information that is forwarded to the search engine 102 in any circumstance. A "result item" refers to any record item that the search engine 102 identifies as matching the query. A result item may also be associated with a particular entity, such as a particular address, region, business, person, etc. In that interpretation, the objective of the search engine 102 is to discover the entities that most closely match the query, and to order those entities by relevance. A token, as the term is used herein, refers to any part of a query or result item. In the case of a query, a query token may correspond to a query term, query term fragment, etc., and/or any information derived from a query term, query term fragment, etc. A "token" may be considered synonymous with "part," "piece," or "component."

In some implementations, the query and/or the result items each include features of different respective types and combinations of types. For example, FIG. 1 shows an illustrative query 106. The query 106 includes a collection of text-based features 108, structure-based features 110, geo-based features 112, and any other context features 114 (e.g., time-based features, etc.). Similarly, any candidate result item can include any of the above identified features.

The text-based features 108 describe any text that is associated with the query 106. For example, the text-based features can describe the words and/or word fragments that make up a text-based query. As will be described below, the search engine 102 can also map the words (or word components) of a text-based query into text embeddings. In some contexts, a text embedding corresponds to a distributed representation of a word or word fragment, and may be expressed as a vector having a prescribed dimension. The distributed representation may express the characteristics of the word or word fragment within a semantic space. The text-based features 108 may encompass any such text embeddings.

The structure-based features 110 describe the presumed structure of the query 106. For example, the search engine 102 can consult a classification engine (not shown) to determine the types of the tokens contained in a query, and to infer the intended organization of those token. For example, different countries express street addresses using different respective formats. When a user submits a query that specifies an address, the classification engine can classify the individual address components of the address. The classification engine may then make the higher-level conclusion as to the likely format of the address, e.g., whether the address pertains to a U.S.-based address or a U.K.-based address. The classification engine can be implemented using a machine-trained classification model (such as a transformer-based model, a convolutional neural network model, a conditional random fields model, a hidden Markov model, a recurrent neural network, etc.), a rules-based algorithm, etc., or any combination thereof. In one non-limiting application, a machine-trained classification model can operate on any lexicon-based features, regular expression features, etc. An illustrative lexicon-based feature indicates whether a piece of text under consideration matches an entry in an address-related lexicon, e.g., by indicating that the token "St." could refer to "street" or the name of a place or geographical feature (as in the St. Laurence River, St. Laurence College, etc.). An illustrative regular expression feature may indicate that a zip code matches a regular expression associated with U.S.-based zip codes.

The geo-based features 112 can describe any geographic information pertaining to the query 106. For example, the geographical information may describe a current presumed position of the user who submits the query 106. The search engine 102 can determine the location of the user based on position signals received from one or more position-determining devices 116. The position-determining device(s) 116 may be incorporated in a user computing device that accompanies the user (and through which the user may submit his or her query). Or the position-determining device(s) 116 may otherwise be accessible to the user computing device. The position-determining device(s) 116 can include any combination of: a triangulation mechanism that determines the position of the user by receiving wireless signals from satellite and/or terrestrial signal sources; a beacon-sensing mechanism that determines the position of the user based on the receipt of wireless signals from a nearby signal source (such as a local hotspot); a dead-reckoning mechanism, etc. For example, one position-determining device corresponds to a Global Positioning System unit provided by a user's smartphone. In other cases, the search engine 102 infers the position of the user based on evidence gleaned from the communication path and application functionality through which the user interacts with the search engine 102. Such evidence can include various position-related signals provided by Internet Service Providers, cell phone towers, browser settings, user profiles, etc.

In addition, or alternatively, the geo-features 112 can infer a region-of-interest based on the user's online behavior. For instance, assume that a user is currently interacting with a map application 118, such as a browser-based map exploration tool, or a vehicle-borne navigation tool, etc. Further assume that the user navigates to a viewing portal 120 that shows a particular region of the city of San Francisco, California. Here, the search engine 102 receives geo-based features that describe the geographical scope of the map presented in the viewing portal 120.

The other context features 114 can include any other information that has a bearing on the context in which the user has submitted his or her query. For instance, the other context features 114 can identify any of: the time at which the user has submitted the query 106, the motion currently exhibited by the user (which can be gauged using motion-sensing devices and models provided by the user's mobile computing device); any history information that describes the prior behavior of the user (such as the user's recent browsing history); the proximity of the user to other known users (which can be gauged based on near-field communication signals and other mechanisms), and so on.

The above-summarized contextual signals are described in the spirit of illustration, not limitation. In summary, the search engine 102 includes a general-purpose architecture that can be trained to process any query having any assortment of features of different types and combinations of types. For this reason, the search engine 102 provides a universal search tool that can be said to be agnostic with respect to the feature-space representation of the queries. In addition, the search engine 102 can be trained to process queries that include only one type of feature, such as queries that include just text-based information. In other words, the novel aspects described below are also useful in application environments that do not take advantage of the capacity of the search engine 102 to process feature-diverse queries.

Like the query 106, any result item may be described using diverse features, including text-based features, structure-based features, geo-based features, and so on. For example, in a map-based environment, a data store 122 may maintain index entries associated with a plurality of address records (where the records themselves can be stored in the data store 122 and/or in one or more other data stores). In some implementations, each address record includes a textual description of the address (e.g., by providing its street name, house or apartment number, city, etc.). Optionally, each address record may also include geographic coordinates associated with the address. Optionally, each address includes structural information; for instance, each address may exhibit a prescribed organization of information units associated with a particular format. The novel features described below can also be applied to result items that are each characterized by one feature type (e.g., textual features).

While the search engine 102 has broad applicability, as described above, this description will emphasize the non-limiting case in which the user submits a map-based query in the context of interacting with any kind of map-based application 118. For example, the user may submit a map-based query "10642A Maple Grove Ave, Youngstown, Ohio, 44502," with the intent of retrieving information regarding a particular address in a particular city. The position-determining device(s) 116 may identify the geographic location from which the user submits the query. The classification engine(s) (not shown) may identify the user's query as likely pertaining to a U.S.-based address. The search engine 102 responds by finding a result item that most closely matches the address specified in the query, and providing any type of information regarding the address. In performing this task, the search engine 102 considers at least the textual content of the query, the format of the address specified in the user's query, and the current position of the user. In another example, the user may submit a map-based query that reads "Hair salons near me, inexpensive," with the intent of finding a barbershop or hair stylist close the user's current location. The search engine 102 may respond by finding a set of result items that identify barbershops near the user's current location, and providing information regarding those barbershops.

The search engine 102 itself includes at least two principal components: a preliminary retrieval engine 124; and the ranking system 104. The preliminary retrieval engine 124 uses any retrieval technology to identify a group of one or more candidate result items that match the query 106. Generally, the preliminary retrieval engine 124 can identify result items by comparing feature information specified in the query 106 with feature information specified in an index (e.g., as provided in the data store 122). The preliminary retrieval engine 124 can use any technique or combination of techniques to implement this comparison. For instance, the preliminary retrieval engine 124 can perform a lexical-based comparison (such as edit distance) to find matching candidate result items. In addition, or alternatively, the preliminary retrieval engine 124 can perform a semantic-based comparison to identify matching candidate result items. For instance, the preliminary retrieval engine 124 can map the text of the query 106 into a query embedding using a machine-trained model. It can then use any distance metric (such as cosine similarity) to find a set of result items having result item embeddings that are within a prescribed distance to the query embedding. The preliminary retrieval engine 124 can use any search technique to expedite this comparison, such as the approximate nearest neighbor (ANN) technique. In general, a query embedding and each candidate result item embedding correspond to distributed representations of the query 106 and result item, respectively, within the same semantic space. In practice, an embedding may be expressed as a vector having a prescribed dimension.

Note that the above examples of the preliminary retrieval engine 124 are mentioned here by way of example, not limitation; the ranking system 104 can be used in conjunction with any type of preliminary retrieval system that generates a set of candidate result items.

The purpose of the ranking system 104 is to order the result items in the set of candidate result items based on their assessed relevance to the query 106. In some cases, the preliminary retrieval engine 124 already provides scores that reflect the relative relevance of the candidate result items. In that case, the task performed by ranking system 104 can be reviewed as re-ranking the candidate search items.

The ranking system 104 may be conceptualized as applying two stages of analysis. In a first stage, a first attention-based neural network 126 can use attention to determine the relationship between the query 106 and each of the candidate result items. This yields a plurality of instances of original query-to-result (Q-to-R) similarity information. Each instance of original Q-to-R similarity information represents an assessed degree of similarity between the query 106 and a particular candidate result item. The Q-to-R similarity information is qualified as "original" because it is determined based on an original set of features that are used to describe the query 106 and each of the candidate result items. For instance, the first attention-based neural network 126 can perform its analysis based on a combination of text-based features and structure-based features.

In the second stage, a ranking subsystem 128 performs listwise interference on the results provided by the first attention-based neural network 126, to yield plural respective ranking scores. The listwise inference operates to adjust the relevance of each candidate result item with reference to the respective relevance of other candidate result items. For example, the listwise inference may lower the relevance of a particular candidate result item upon discovering that another candidate result item is potentially more relevant to the query 106 compared to the particular candidate result item. Generally, the term "listwise inference," as used herein, means that the ranking value of any particular result item is computed based on a consideration of the relevance of each result item in a list of candidate result items. Listwise inference is predicated on the use of a listwise loss function (described below) that is used to train the machine-trained model(s) used by the ranking system 104.

The ranking scores generated by the ranking subsystem 128 provide a final assessment of the order of relevance of the candidate result items. In some cases, the search engine 102 provides a set of the n most relevant candidate result items. In some cases, the user is primarily interested in the candidate result item that is most relevant. Here, the search engine 102 may identify just the top-ranking candidate result item. The search engine 102 can provide any information regarding a candidate result item, such as by providing a description of the result item and/or providing a link to further information regarding the result item. In addition, or alternatively, the search engine 102 can annotate a digital map with information that identifies the location of one or more candidate result items.

In some implementations, the ranking subsystem 128 operates on the output results of the first attention-based neural network 126 in combination with supplemental feature information. For example, a combination component 130 can concatenate the geo-based features 112 with the instances of the original Q-to-R similarity information, to produce instances of enhanced similarity information. The remainder of the ranking subsystem 128 operates on the instances of enhanced similarity information. Other implementations introduce other type(s) of features besides geo-based features 112, or in addition to the geo-based features 112. In addition, or alternatively, other implementations integrate additional features at other junctures of the processing flow compared to the juncture at which this information is added in the example of FIG. 1. Alternatively, other implementations omit the combination component 130 entirely. In those cases, all stages of the ranking system 104 operate on the same kinds of features.

In some implementations, the ranking subsystem 128 includes a second attention-based neural network 132 in combination with a scoring neural network 134. The second attention-based neural network 132 applies self-attention to the output results of the combination component 130. That is, the second attention-based neural network 132 performs listwise inference by determining a relationship of a particular query-result paring (e.g., Query, $R_1$) to other query-result pairings (e.g., Quern$_1$, $R_2$). In one non-limiting application, the scoring neural network 134 can correspond to a fully-connected neural network that includes any number of layers, and which can use any activation function(s) (such as ReLU, etc.). The scoring neural network 134 maps the output of the second attention-based neural network 132 into the plural ranking scores.

Other implementations can vary the above-described configuration in one or more respects. For example, in another implementation the ranking subsystem 128 uses a different kind of neural network than that which is described above, and/or using a rules-based system. For example, another implementation uses a decision tree model to implement at least part of the ranking subsystem 128. In addition, or alternatively, another implementation integrates the first attention-based neural network 126 with the ranking subsystem 128.

A training system 136 produces the machine-trained model(s) that govern the operation of the ranking system 104. For example, the training system 136 can produce a first machine-trained model that governs the operation of the first attention-based neural network 126, a second machine-trained model that governs the operation of the second attention-based neural network 132, and a third machine-trained model that governs the operation of the scoring neural network 134. In some implementations, the training system 136 trains all three machine-trained models at the same time with the objective of maximizing or minimizing a specified loss function. The training system 136 performs its training based on a set of training examples stored in a data store 138. The training examples can provide examples of queries together with correctly-ranked sets of result items that match the respective queries.

In some implementations, the training system 136 uses a loss function that describes the performance of the ranking system 104 using a normalized discounted cumulative gain (NDCG) metric (which is a kind of listwise loss function). For example, the training system 136 can promote the generation of a single top-ranking result using the following illustrative ranking metric:

$$NDCG@1 = \frac{2^{rel_{R_1}}}{2^{max(rel)} - 1}. \tag{1}$$

The notation "@1" indicates that the NDCG metric describes the performance of the top-ranking result item ($R_1$). The symbol $rel_{R_1}$ refers to the actual assessed relevance of the top-ranking result item ($R_1$). The symbol max(rel) refers to the maximum relevance within a set of relevance scores for a set of respective result items. The training system 136 iteratively modifies its model(s) in the course of processing a set of training examples with the objective of optimizing the above-described NDCG@1 metric. Once fully trained, the resultant machine-trained model(s) will enable the ranking system 104 to correctly identify the top-ranking result item in most cases. In other cases, the training system 136 can produce model(s) for the more general case of NDCG@k (where k is any non-zero positive integer). In still other cases, the loss function can use a performance metric other than NDCG, such as a pairwise performance metric.

Figure 2:
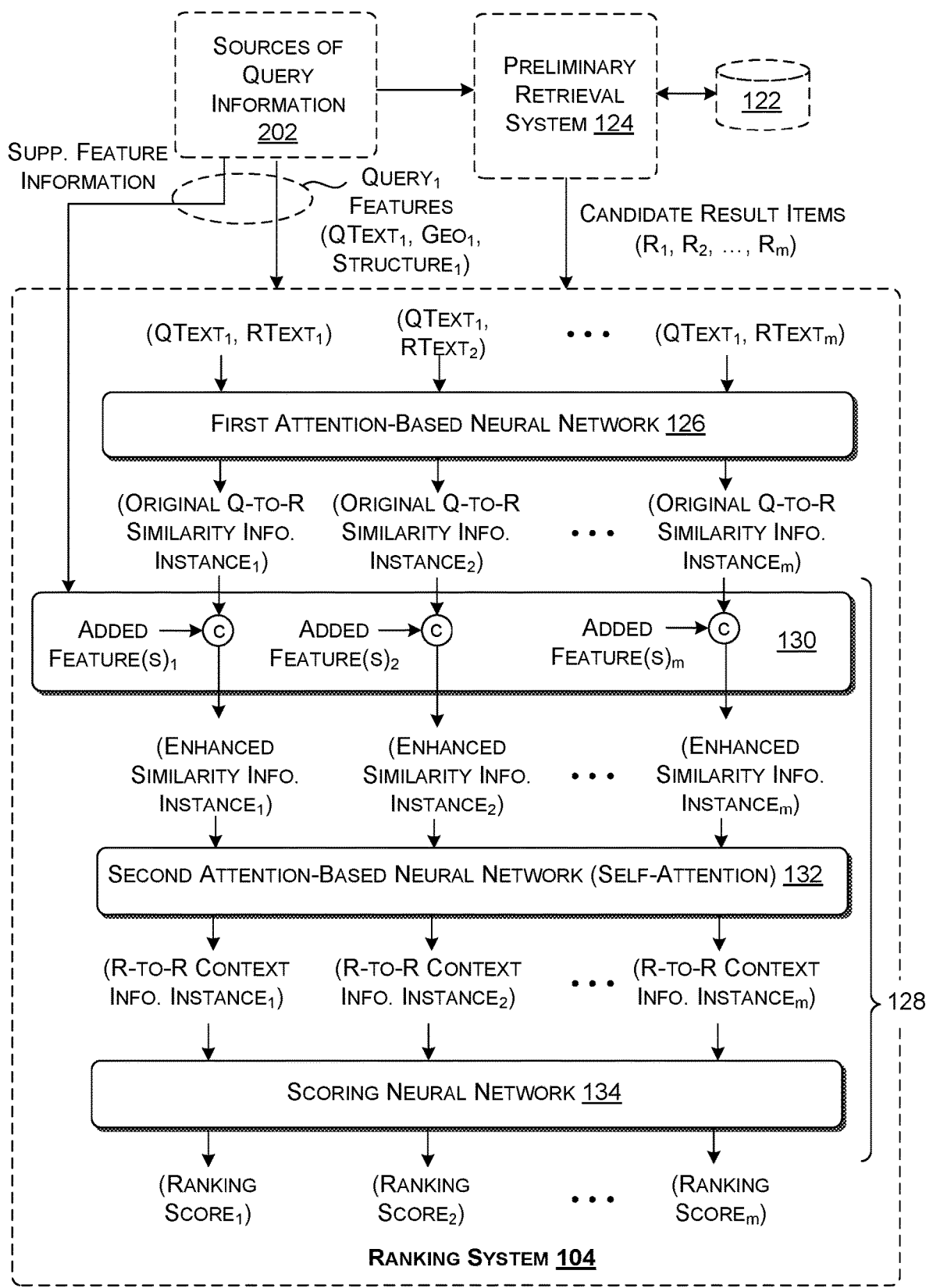
FIG. 2 shows additional illustrative details of the ranking system of FIG. 1.

FIG. 2 shows a more detailed illustration of the ranking system 104. The ranking system 104 receives a query (Query$_1$) from one or more sources of query information 202. It also receives a set of candidate result items ($R_1$, $R_2$, ..., $R_m$) that match the query, as determined by the preliminary retrieval engine 124. As previously described, the query and each candidate result item can include plural different kinds of features.

Each column of operations shown in FIG. 2 pertains to actions performed with respect to a particular pairing of the input query (Query$_1$) and a particular candidate result item.

For instance, the first column of operations in FIG. 2 refers to actions performed for the pairing (Query$_1$, R$_1$), the second column of operations refers to actions performed for the pairing (Query$_1$, R$_2$), and so on.

To repeat, the first attention-based neural network 126 maps instances of original feature information to original Q-to-R similarity information. The original feature information may include text-based features and structure-based features. The combination component 130 combines supplemental feature information with each instance of Q-to-R similarity information, e.g., by concatenating these two pieces of information together. In some implementations, each instance of supplemental feature information describes the geographical context in which the user submits the query. The combination component 130 produces a plurality of instances of enhanced similarity information.

The second attention-based neural network 132 uses listwise inference to map the plurality of instances of enhanced similarity information to plural respective instances of R-to-R context information. As noted above, the second attention-based neural network 132 can perform listwise inference using self-attention (described in greater detail below). The scoring neural network 134 maps the plurality of instances of R-to-R context information into the plural respective ranking scores.

Figure 3:
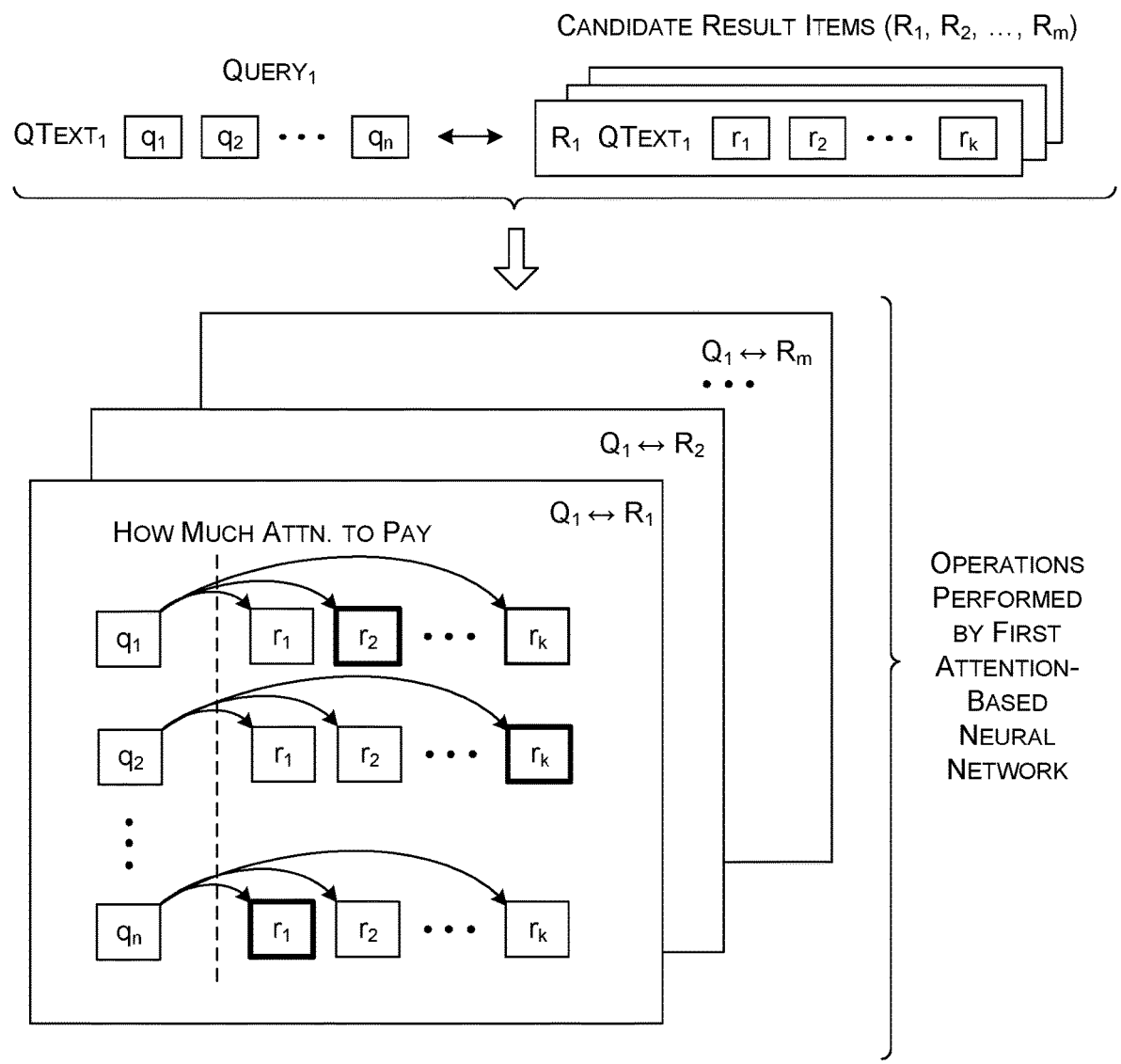
FIG. 3 provides an overview of the operation of a first attention-based neural network for use in the ranking system of FIGS. 1 and 2.
Figure 4:
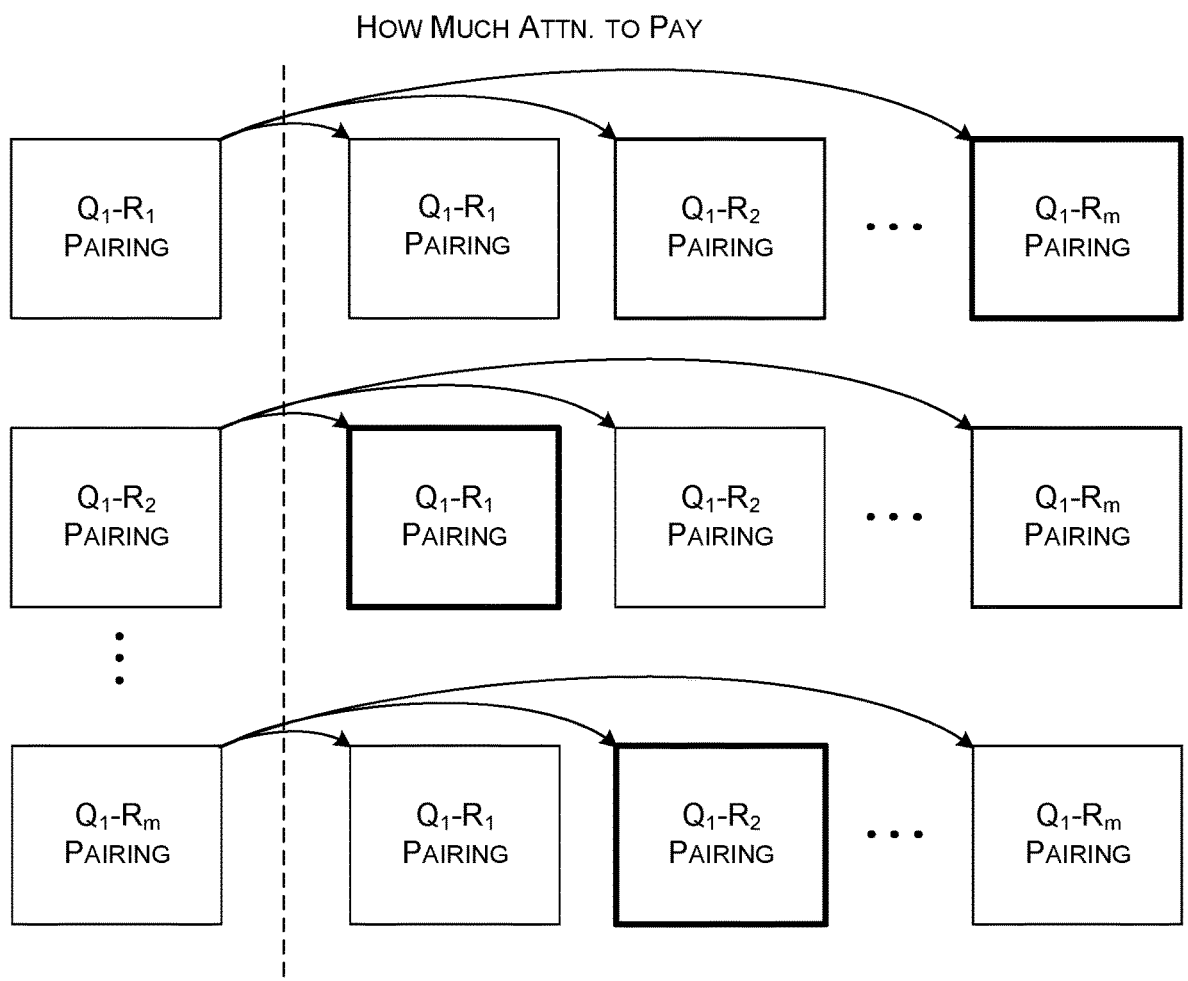
FIG. 4 provides an overview of the operation of a second attention-based neural network for use in the ranking system of FIGS. 1 and 2.

FIGS. 3 and 4 provide high-level information regarding the attention-based operation performed by the first attention-based neural network 126 and the second attention-based neural network 132, respectively. Starting with FIG. 3, assume that the input query (Query$_1$) can be decomposed into n query tokens ($q_1, q_2, \ldots, q_n$). For example, each token may correspond to a separate word in a multi-word query. Alternatively, the ranking system 104 can break up the input query into fragments of words (e.g., n-grams, word fragments produced by a machine-trained model, etc.). Similarly, assume that each candidate result item can be decomposed into k tokens ($r_1, r_2, \ldots, r_k$). The result items tokens can correspond to individual words associated with a candidate result items, fragments of words, etc.

In some implementations, the ranking system 104 pads the queries with dummy values so that they all have the same number of tokens. It optionally similarly pads the candidate result items such that they all have the same number of tokens. Finally, it optionally pads the number of result items per query to ensure that all queries are associated with the same number of candidate result items. This padding operation can be omitted for the case in which the input data items fed to the ranking system 104 have uniform predetermined lengths.

From a high-level standpoint, for a particular pairing of the input query and a candidate result item (e.g., R$_1$), the first attention-based neural network 126 determines how much attention that each query token in the input query should "pay" to each result item token in the candidate result item. (Different line weights in FIG. 3 represent different respective amounts of attention to be paid to different result item tokens.) In other words, the first attention-based neural network 126 determines how much focus should be placed on each token in the candidate result item when processing a particular query token. The first attention-based neural network 126 is said to produce query-to-result (Q-to-R) similarity information because, as a whole, each instance of that information reflects the relevance of the query to a particular candidate result item.

More formally stated, attention can be expressed with respect to three matrices: a query matrix Q, a key matrix K, and a value matrix V. The first attention-based neural network 126 produces the query matrix Q by packing query embedding information (described below) into a single matrix $E_{query}$, and then projecting that single matrix $E_{query}$ into the query matrix Q using a first machine-trained weighting matrix $W^{Q1}$, where the superscript "1" indicates that this is a weighting matrix applied by the first attention-based neural network 126. The first attention-based neural network 126 produces the key matrix K by packing result item embedding information (described below) into a single matrix $E_{result}$, and then projecting that single matrix $E_{result}$ into the K matrix using a second machine-trained weighting matrix $W^{K1}$. The first attention-based neural network 126 produces the value matrix V by mapping the same single result item matrix $E_{result}$ into the value matrix V using a third machine-trained matrix $W^{V1}$. In other words, the query matrix Q reflects query information, and both the key matrix K and the value matrix V reflect result item information.

The first attention-based neural network 126 then generates attention information based on the following illustrative equation:

$$\text{Attention}(Q, K, V) = \text{Softmax}\left(\frac{QK^T}{s}\right)V. \qquad (2)$$

The part of Equation (2) within parentheses describes the dot product of the query matrix Q and the transpose of the key matrix K, divided by a scaling factor s. This yields a scaled dot product result. Equation (2) computes the softmax (normalized exponential function) of the dot product result to produce a softmax result, and then multiples the softmax result by the value matrix V. More generally stated, the query matrix Q describes the information being sought, the key matrix K describes candidate result item information that is being compared with the query information, and the value matrix V modifies the dot product $QK^T$ to selectively promote different parts of the dot product.

Advancing to FIG. 4, the second attention-based neural network 132 computes attention information using Equation (2), but computes the query matrix Q, key matrix K, and value matrix V in a different way compared to that described above. More specifically, the second attention-based neural network 132 packs the instances of enhanced similarity information into a matrix $E_{enhanced}$ and multiples that same matrix $E_{enhanced}$ by three respective machine-trained weighting matrices ($W^{Q2}$, $W^{K2}$, $W^{V2}$) to produce the Q, K, and V matrices. The superscript "2" in the weighting matrices designates that the weighting matrices pertain to the second attention-based neural network 132.

In other words, the second attention-based neural network 132 applies self-attention. This means that the second attention-based neural network 132 determines the significance of each part of the enhanced similarity information on every other part of the enhanced similarity information. For example, this analysis can determine how much the ranking score attributed to one pairing of the query and a particular candidate result item has on the ranking score attributed to another pairing of the query and another candidate result item. This is also one manifestation of what is referred to above as listwise inference.

The attention mechanisms described above can be varied in different ways. For example, each attention mechanism can use multiple heads to perform the same analysis described above for different representational subspaces (produced by different sets of respective weighting matrices). The attention mechanism can then concatenate the results provided by the different heads. Other implementations can perform attention in a different way compared to that described above, such as by using a recurrent neural network (RNN).

Figure 5:
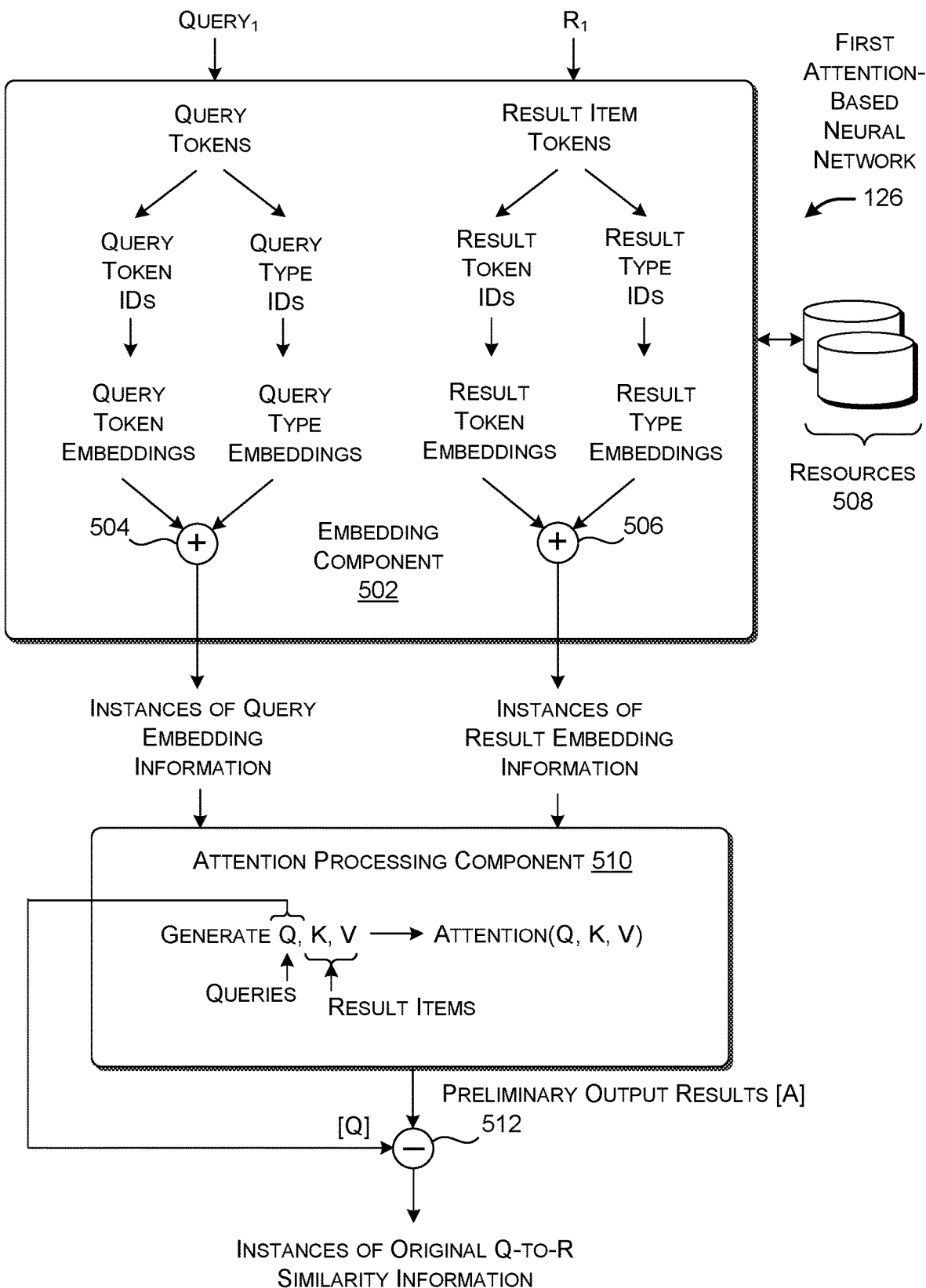
FIG. 5 shows additional illustrative details regarding the first attention-based neural network.

FIG. 5 shows further details of one implementation of the first attention-based neural network 126. The operation of the first attention-based neural network 106 will be described below with respect to a particular input query (Query$_1$) and a particular candidate result item (R$_1$).

As a preliminary operation, an embedding component 502 generates one or more instances of query embedding information for the query, and one or more instances of result item embedding information for the candidate result item. With respect to the input query, the embedding component 502 first identifies a collection of query tokens that compose the query. As noted above, the embedding component 502 can decompose a query into any level of granularity, e.g., by identifying a query token associated which each word in the query, or a query token associated with each word fragment. The embedding component 502 can perform this text segmentation task by using one or more segmentation rules, a lookup table, a machine-trained model, etc., or any combination thereof. The embedding component 502 can then map the query tokens into respective query token identifiers (IDs). It can perform this task using a lookup table, hashing function, etc., or any combination thereof. The embedding component 502 can then map the query token IDs into respective distributed query token embeddings. It can perform this task using a lookup table, machine-trained mapping model, etc., or any combination thereof.

Optionally, the embedding component 502 can also use the above-described functionality to identify a query type ID associated with each query token. The query type ID identifies the type of the query token under consideration, e.g., by labeling a number that appears in the query as a U.S. zip code instead of a U.K. postal code. The embedding component 502 can perform this task using one or more classification rules, a lookup table, a machine-trained model, etc., or any combination thereof. The embedding component 502 can map each query type ID into a query type embedding. It can perform this task using the same mapping mechanism applied to the query token IDs, so as to map the query token IDs and query type IDs into the same representational space. Note that the query token embeddings describe the textual and semantic content of a query, while the query type embeddings reveal information about the structure of the query.

Finally, the embedding component 502 can apply a combination component 504 to add the query token embeddings to the query type embeddings on an element-by-element basis. This yields one or more instances of query embedding information. More specifically, for a given query token, the combination component 504 will produce an instance of query embedding information that represents the summation of its corresponding query token embedding and query type embedding. This also means that each instance of query embedding information expresses a combination of text-based feature information and structure-based feature information for the query token under consideration. In other implementations, the ranking system 104 fuses text-based feature information and structure-based feature information at a later (or, more generally, different) stage than what is shown in FIG. 5.

The embedding component 502 performs the same operations described above for a candidate result item. As the last stage of the process, a combination component 506 produces one or more instances of result embedding information.

Overall, the embedding component 502 provides a resource-efficient way of encoding queries and result items. For instance, the embedding component 502 requires less memory to store input information compared to a solution that receives input information in the form of concatenated pairings of queries and candidate result items.

Further note that FIG. 5 shows one or more resources 508 for use by the embedding component 502 in producing the query embedding information and the result embedding information. The mapping resources 508 may provide one or more lookup tables, hashing functions, machine-trained word segmentation models (e.g., the wordpiece model (WPM)), machine-trained classification models (such as any of the address classification models described above), machine-trained mapping models for producing embeddings, etc.

Other implementations can produce the query embedding information and the result embedding information using different techniques than described above. More generally stated, the embedding component 502 operates by identifying tokens of a piece of text (e.g., query text or a candidate result item text), to produce instances of token information. It also classifies those tokens to produce instances of type information. It maps both the instances of token information and the instances of type information into the same semantic space, to produce, respectively, text embeddings and type embeddings. It then combines, on a token-by-by token basis, the text embeddings and type embeddings, to respectively produce instances of embedding information.

An attention processing component 510 next determines the similarity between the query and the candidate result item based on the query embedding information and the result embedding information. Insofar as the embedding information incorporates both text-based and structure-based features, the attention processing component 510 can be said to consider both the content and structure of the query and the result item when assessing the similarity between the query and the result item. In greater detail, the attention processing component 510 produces the matrices Q, K, and V in the manner described above, based on the query embedding information and the result embedding information. To repeat, the attention processing component 510 produces the query matrix Q based on the query embedding information in conjunction with a first machine-trained weighting matrix $W^{Q1}$. The attention processing component 510 produces the key matrix K based on the result embedding information and a second machine-trained weighting matrix $W^{K1}$. The attention processing component 510 produces the value matrix V based on the result embedding information and a third machine-trained weighting matrix $W^{V1}$ Subsequently, the attention processing component 510 applies Equation (2) to generate preliminary output results in the form a matrix A of attention information.

A difference component 512 next subtracts the Q matrix from the A matrix on an element-by-element basis. More specifically, in some implementations, the difference component 512 generates instances of Q-to-R similarity information T based on the following equation, for a particular pairing g of the input query and a particular candidate result item:

$$T_g = \sum_{m}^{M_Q} (Q_{g,m} - A_{g,m})^2. \tag{3}$$

In this equation, $M_Q$ refers to a number of query tokens in the input query, and m refers to a particular one of these query tokens. $Q_{q,m}$ refers to a particular element in the matrix Q for the particular pairing g and the particular query token m, and $A_{g,m}$ refers to a particular element in the matrix A for the particular pairing g and the particular query token m. In general terms, Equation (3) sums the squared element-wise differences between the Q and A matrices. This operation produces a vector having a prescribed dimension D for each pairing g of the input query and a particular candidate result item. Overall, the difference component 512 reveals an extent of semantic similarity between the input query and a result item. If the difference is close to zero, then the query and result item have a high degree of similarity. If the difference is large, then the query and result item have a low degree of similarity. The training system 136 can leverage this insight to produce a machine-trained model that emphasizes the role of some query tokens and deemphasizes the role of other query tokens. Other implementations combine the query embedding information and the matrix A in different ways compared to the operations specified by Equation (3). For example, another implementation uses a machine-trained model to determine how the matrix A is to be modified by the query embedding information.

Figure 6:
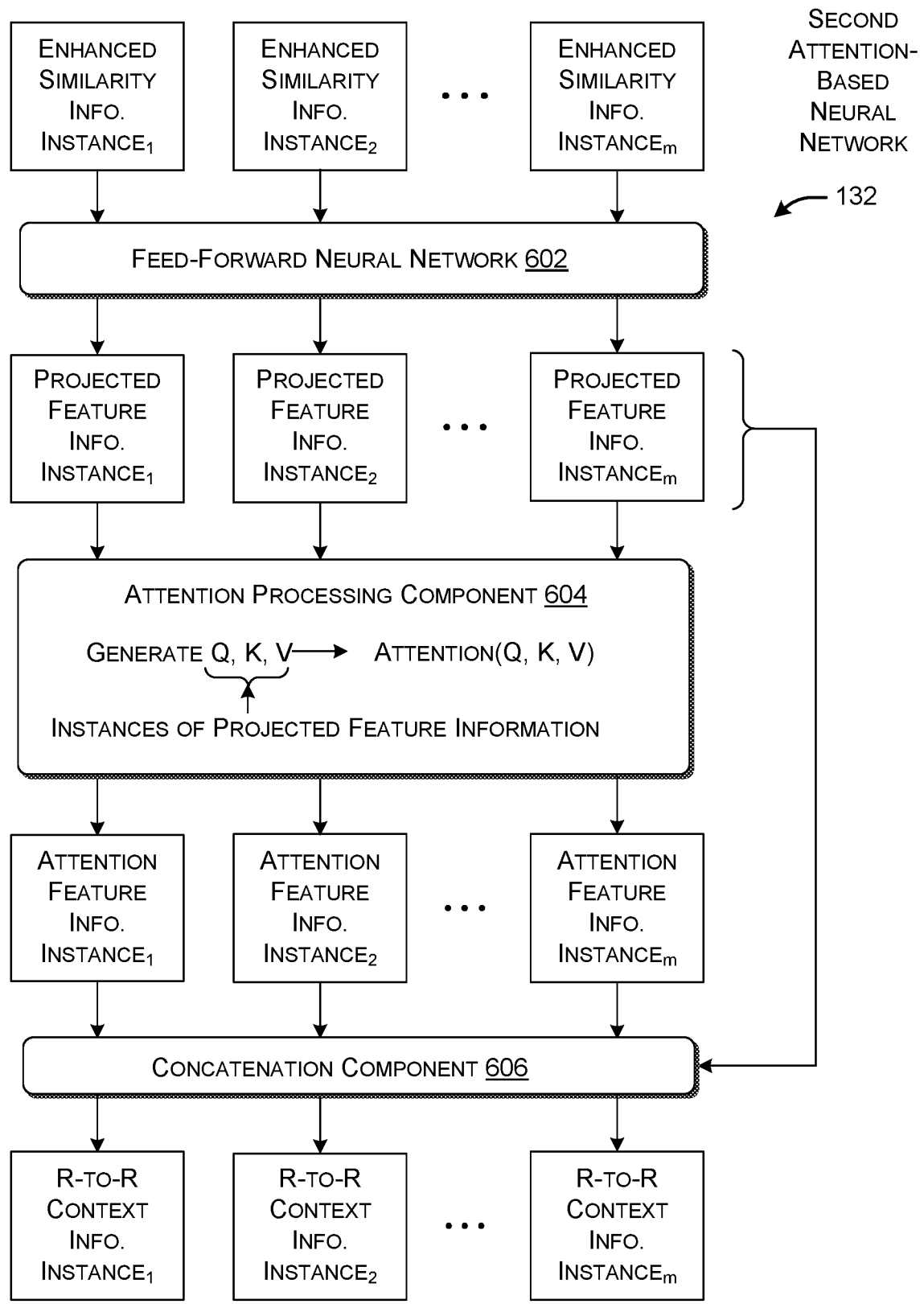
FIG. 6 shows additional illustrative details regarding the second attention-based neural network.

FIG. 6 shows one non-limiting implementation of the second attention-based neural network 132. From top to bottom, a feed-forward neural network 602 can use any number of fully-connected layers to map a plurality of instances of enhanced similarity information into a plurality of instances of projected feature information. (As noted above, each instance of enhanced similarity information may correspond to a vector of dimension D). This operation has the effect of mapping feature information originating from different sources into the same representational embedding space.

An attention processing component 604 then maps the plurality of instances of projected feature information into a plurality of corresponding instances of attention feature information. As described above, the attention processing component 604 applies self-attention, meaning that all of its three matrices (Q, K, V) represent different projections of the same enhanced similarity information. As previously described, the ranking system 104 can optionally pad its queries to ensure that they have the same number of tokens. It can similarly pad its result items to ensure that they have the same number of tokens. It can also pad its identified sets of results items to ensure that each set has the same number of result items. In these cases, the attention processing component 604 can apply appropriate masks to ensure that the padded entries are masked out and do not bias the result of the attention calculations. This padding operation can be omitted for the case in which the input data items fed to the ranking system 104 have uniform predetermined lengths.

A concatenation component 606 optionally concatenates the attention feature information with corresponding instances of the projected feature information, to produce a plurality of instances of result-to-result (R-to-R) information. This concatenation operation represents a residual connection insofar as the input of the attention processing component 604 is combined with its output. Other implementations can combine the attention feature information with the projected feature information by some mechanism other than concatenation, e.g., by fusing this information together via one or more machine-trained layers.

In summary to Section A, the ranking system 104 has various technical merits. For instance, according to one technical merit, the ranking system 104 relies, in part, on its attention layers to automatically extract relevant features from input information. This eliminates or reduces the need to produce manually-crafted features, which is a challenging and time-consuming task. According to another technical merit, the ranking system 104 can generate the ranking scores in a single pass. This aspect enables the ranking system 104 to efficiently consume computing resources. It also increases the ranking system's speed relative to solutions that determine ranking scores using iterative calculations. The ranking system 104 can further reduce the consumption of system resources (such as memory resources) insofar as it does not require large-sized instances of input information, e.g., in the form of a concatenation of query information with result item information.

According to another technical merit, the ranking system 104 offers a solution that can be applied to many different environments and many different kinds of queries with reduced (or no) modification of its code. This aspect contributes to the flexibility and scalability of the ranking system 104. For instance, the architecture shown in FIG. 1 can be applied without modification (or with minimal modification) to different kinds of queries and candidate result items, characterized by different kinds of features. The task of manually revising a model to account for new features (e.g., in the case of a decision tree model) is time-consuming, complex, and prone to error; hence, the elimination or reduction of this task may significantly facilitate development and maintenance of the ranking system 104.

The above-noted possible technical benefits are mentioned here in the spirit of illustration, not limitation. The ranking system 104 may offer yet other benefits.

B. Illustrative Processes

FIGS. 7 and 8 show processes that explain the operation of the ranking system 104 of Section A in flowchart form. Since the principles underlying the operation of the ranking system 104 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

FIG. 7 shows a process 702 that represents an overview of the operation of the ranking system 104. In block 704, the ranking system 104 obtains the query and a plurality of candidate result items that match the query. For instance, the ranking system 104 may obtain the query from a local or remote user, and/or from some other source(s) 202 of query information. The ranking system 104 may obtain the candidate result items from the preliminary retrieval system 102. The query has one or more tokens, and each candidate result item has one or more tokens. The ranking system 104 may identify the tokens itself and/or rely on any other resource(s) to identify the tokens. In block 706, the ranking system 104 generates, using the first attention-based neural network 126, a plurality of instances of query-to-result similarity information respectively corresponding to the plurality of candidate result items, each instance of query-to-result similarity information expressing an extent of attention that each token of the query should pay to each token of a particular candidate result item. In block 708, the ranking system 104 generates, using the ranking subsystem 128, plural ranking scores based on the plurality of instances of query-to-result information. The plural scores ranking identify an order of relevance of the plurality of candidate result items to the query. In block 710, the ranking system 104 identifies at least a top-ranking candidate result item to be presented to a user based on the plural scores.

FIG. 8 shows a process 802 that represents one manner of operation of the ranking subsystem 128. Assume that the first attention-based neural network 126 uses a set of original features to describe the query and the plurality of candidate result items, and that the query-to-result information generated by the first attention-based neural network 126 is original query-to-result information. In block 804, the ranking subsystem 128 combines the plurality of instances of original query-to-result similarity information with supplemental feature information pertaining to the query, to produce a plurality of respective instances of enhanced similarity information. In block 806, the ranking subsystem 128 generates, using the second attention-based neural network 132, a plurality of instances of result-to-result context information using self-attention, each instance of result-to-result context information expressing an extent of attention that a particular instance of enhanced similarity information should pay to other instances of enhanced similarity information. In block 808, the ranking subsystem 128 maps, using the scoring neural network 134, the plurality of instances of result-to-result context information into the plural respective ranking scores.

C. Representative Computing Functionality

FIG. 9 shows an example of computing equipment that can be used to implement any of the systems summarized above. The computing equipment includes a set of user computing devices 902 coupled to a set of servers 904 via a computer network 906. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 906 can be implemented as a local area network, a wide area network (e.g., the Internet), one or more point-to-point links, or any combination thereof.

FIG. 9 also indicates that the search engine 102 and the training system 136 can be spread across the user computing devices 902 and/or the servers 904 in any manner. For instance, in one case, the search engine 102 is entirely implemented by one or more of the servers 904. Each user may interact with the servers 904 via a browser application or other programmatic interface provided by a user computing device. In another case, the search engine 102 is entirely implemented by a user computing device in local fashion, in which case no interaction with the servers 904 is necessary. In another case, the functionality associated with the search engine 102 is distributed between the servers 904 and each user computing device in any manner.

Figure 10:
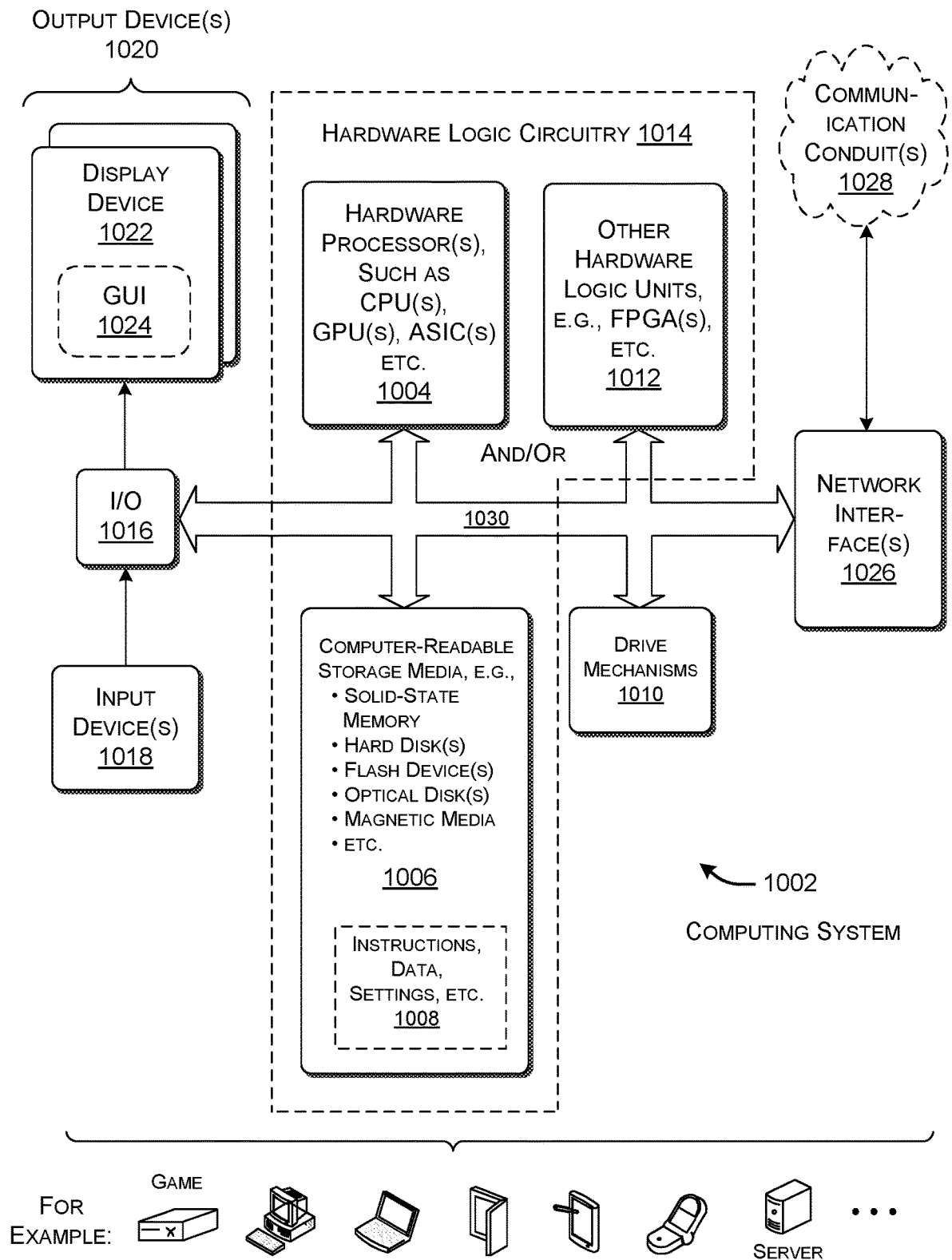
FIG. 10 shows an illustrative type of computing device that can be used to implement any aspect of the features shown in the foregoing drawings.

FIG. 10 shows a computing system 1002 that can be used to implement any of the mechanisms set forth in the above-described figures. For instance, the type of computing system 1002 shown in FIG. 10 can be used to implement any user computing device or any server shown in FIG. 9. In all cases, the computing system 1002 represents a physical and tangible processing mechanism.

The computing system 1002 can include one or more hardware processors 1004. The hardware processor(s) 1004 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing system 1002 can also include computer-readable storage media 1006, corresponding to one or more computer-readable media hardware units. The computer-readable storage media 1006 retains any kind of information 1008, such as machine-readable instructions, settings, data, etc. Without limitation, the computer-readable storage media 1006 may include one or more solid-state devices, one or more magnetic hard disks, one or more optical disks, magnetic tape, and so on. Any instance of the computer-readable storage media 1006 can use any technology for storing and retrieving information. Further, any instance of the computer-readable storage media 1006 may represent a fixed or removable unit of the computing system 1002. Further, any instance of the computer-readable storage media 1006 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1002 can utilize any instance of the computer-readable storage media 1006 in different ways. For example, any instance of the computer-readable storage media 1006 may represent a hardware memory unit (such as Random Access Memory (RAM)) for storing transient information during execution of a program by the computing system 1002, and/or a hardware storage unit (such as a hard disk) for retaining/archiving information on a more permanent basis. In the latter case, the computing system 1002 also includes one or more drive mechanisms 1010 (such as a hard drive mechanism) for storing and retrieving information from an instance of the computer-readable storage media 1006.

The computing system 1002 may perform any of the functions described above when the hardware processor(s) 1004 carry out computer-readable instructions stored in any instance of the computer-readable storage media 1006. For instance, the computing system 1002 may carry out computer-readable instructions to perform each block of the processes described in Section B.

Alternatively, or in addition, the computing system 1002 may rely on one or more other hardware logic units 1012 to perform operations using a task-specific collection of logic gates. For instance, the hardware logic unit(s) 1012 may include a fixed configuration of hardware logic gates, e.g., that are created and set at the time of manufacture, and thereafter unalterable. Alternatively, or in addition, the other hardware logic unit(s) 1012 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 10 generally indicates that hardware logic circuitry 1014 includes any combination of the hardware processor(s) 1004, the computer-readable storage media 1006, and/or the other hardware logic unit(s) 1012. That is, the computing system 1002 can employ any combination of the hardware processor(s) 1004 that execute machine-readable instructions provided in the computer-readable storage media 1006, and/or one or more other hardware logic unit(s) 1012 that perform operations using a fixed and/or programmable collection of hardware logic gates. More generally stated, the hardware logic circuitry 1014 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1014 that performs a particular function or combination of functions.

In some cases (e.g., in the case in which the computing system 1002 represents a user computing device), the computing system 1002 also includes an input/output interface 1016 for receiving various inputs (via input devices 1018), and for providing various outputs (via output devices 1020). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1022 and an associated graphical user interface presentation (GUI) 1024. The display device 1022 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1002 can also include one or more network interfaces 1026 for exchanging data with other devices via one or more communication conduits 1028. One or more communication buses 1030 communicatively couple the above-described units together.

The communication conduit(s) 1028 can be implemented in any manner, e.g., by a local area computer network, a wide area computer network (e.g., the Internet), point-to-point connections, etc., or any combination thereof. The communication conduit(s) 1028 can include any combination of hardwired links, wireless links, routers, gateway functionality, name servers, etc., governed by any protocol or combination of protocols.

FIG. 10 shows the computing system 1002 as being composed of a discrete collection of separate units. In some cases, the collection of units corresponds to discrete hardware units provided in a computing device chassis having any form factor. FIG. 10 shows illustrative form factors in its bottom portion. In other cases, the computing system 1002 can include a hardware logic unit that integrates the functions of two or more of the units shown in FIG. 1. For instance, the computing system 1002 can include a system on a chip (SoC or SOC), corresponding to an integrated circuit that combines the functions of two or more of the units shown in FIG. 10.

The following summary provides a non-exhaustive set of illustrative examples of the technology set forth herein.

(A1) According to a first aspect, some implementations of the technology described herein include a method (e.g., the process 702), using one more computing devices (e.g., computing system 1002), for ranking a plurality of candidate result items in response to a query. The method includes obtaining (e.g., in block 704) the query and the plurality of candidate result items that match the query, the query having one or more tokens, and each candidate result item having one or more tokens. The method further includes generating (e.g., in block 706), using a first attention-based neural network (e.g., the first attention-based neural network 126), a plurality of instances of query-to-result similarity information respectively corresponding to the plurality of candidate result items, each instance of query-to-result similarity information expressing an extent of attention that each token of the query should pay to each token of a particular candidate result item. The method further includes generating (e.g., in block 708), using a ranking subsystem (e.g., ranking subsystem 128), plural ranking scores based on the plurality of instances of query-to-result information, the plural ranking scores identifying an order of relevance of the plurality of candidate result items to the query. The method then includes identifying (e.g., in block 710) at least a top-ranking candidate result item to be presented to a user based on the plural scores.

According to one technical characteristic, the method A1 has low latency because it generates the ranking scores in a single pass. Further, the method, by virtue of its use of the first attention-based neural network and ranking subsystem, can eliminate or reduce the use of manually-specified features, which facilitates its development and maintenance. Further, the method, by virtue of its use of the first attention-based neural network and ranking subsystem, provides a general-purpose and scalable solution that can be applied to many different environments and queries. Other aspects of the technology set forth below share the above-noted technical characteristics.

(A2) According some implementations of the method of A1, the first attention-based neural network uses a set of original features to describe the query and the plurality of candidate result items. The plurality of instances of query-to-result information generated by the first attention-based neural network are instances of original query-to-result information. Further, the processing performed by the ranking subsystem includes: combining (e.g., in block 804 of FIG. 8) the plurality of instances of original query-to-result similarity information with supplemental feature information pertaining to the query, to generate a plurality of respective instances of enhanced similarity information; generating (e.g., in block 806), using a second attention-based neural network (e.g., the second attention-based neural network 132), a plurality of instances of result-to-result context information using self-attention, each instance of result-to-result context information expressing an extent of attention that a particular instance of enhanced similarity information should pay to other instances of enhanced similarity information; and mapping (e.g., in block 808), using a scoring neural network (e.g., scoring neural network 134), the plurality of instances of result-to-result context information into the plural respective ranking scores.

(A3) According to some implementations of the method of A2, the set of original features includes at least text-based features that describe text associated with the query and each candidate result item.

(A4) According to some implementations of the method of A3, the set of original features also includes at least structure-based features that describe structural composition of the query and each candidate result item.

(A5) According to some implementations of the method of any of A1-A4, the first attention-based neural network operates on: one or more instances of query embedding information associated with the query; and one or more instances of result embedding information associated with each candidate result item.

(A6) According to some implementations of the method of A5, the method generates the one or more instances of query embedding information by: identifying the one or more tokens of the query, to overall generate one or more instances of query token information; identifying a type associated which each token of the query, to overall generate one or more instances of query type information; mapping the one or more instances of query token information to respective one or more query token embeddings; mapping the one or more instances of query type information to respective one or more query type embeddings; and combining the one or more query token embeddings and the one or more query type embeddings to generate the one or more instances of query embedding information. According to one technical characteristic, the method of A6 enables the ranking system 104 to store and manipulate input information in a memory-efficient manner.

(A7) According to some implementations of the method of A5, the first attention-based neural network generates preliminary output results. Further, the first attention-based neural network generates the plurality of instances of query-to-result similarity information by generating an element-by-element difference of the preliminary output results and the one or more instances of query embedding information. This aspect of the technology helps emphasize the role of some query tokens and deemphasize the role of other query tokens.

(A8) According to some implementations of the method of A7, the first attention-based neural network forms each instance of query-to-result information for a particular pairing of the query and a specified candidate result item by summing a square of the differences associated with the particular pairing.

(A9) According to some implementations of the method of any of A2-A4, the supplemental feature information describes a geographical context in which the query was made.

(A10) According to some implementations of the method of A9, the geographical context refers to a position associated with the user who submitted the query.

(A11) According to some implementations of the method of A9, the geographical context refers to a portion of a digital map specified by the user.

(A12) According to some implementations of the method of any of A2-A4 and A9-11, the second attention-based neural network operates by: mapping the plurality of instances of enhanced similarity information to a plurality of respective instances of projected feature information; performing self-attention on the plurality of instances of projected feature information to generate a plurality of respective instances of attention feature information; and combining the plurality of instances of projected feature information with the plurality of instances of attention feature information to respectively generate the plurality of instances of result-to-result context information.

(A13) According to some implementations of the method of any of A2-A4 and A9-A12, the scoring neural network includes at least two or more fully-connected neural network layers.

(B1) Other implementations of the technology described herein include a method (e.g., the processes 702 and 802) for ranking a plurality of candidate result items in response to a query, the query having one or more tokens, and each candidate result item having one or more tokens. The method relies on hardware logic circuitry (e.g., the hardware logic circuitry 1014) that implements a first attention-based neural network (e.g., the first attention-based neural network 126), a second attention-based neural network (e.g., the second attention-based neural network 132), and a scoring neural network (e.g., the scoring neural network 134). The method includes generating (e.g., in block 706), using the first attention-based neural network, a plurality of instances of original query-to-result similarity information respectively corresponding to the plurality of candidate result items, each instance of original query-to-result similarity information expressing an extent of attention that each token of the query should pay to each token of a particular candidate result item. The first attention-based neural network is configured to use a set of original features to describe the query and the plurality of candidate result items. The plurality of instances of original query-to-result similarity information are subsequently combined with supplemental feature information pertaining to the query, to generate a plurality of respective instances of enhanced similarity information. The method further includes generating (e.g., in block 806 of FIG. 8), using the second attention-based neural network, a plurality of instances of result-to-result context information using self-attention, each instance of result-to-result context information expressing an extent of attention that a particular instance of enhanced similarity information should pay to other instances of enhanced similarity information. The method further includes mapping (e.g., in block 808), using the scoring neural network, the plurality of instances of result-to-result context information into plural respective ranking scores, the plural ranking scores identifying an order of relevance of the plurality of candidate result items to the query. B1 shares the technical characteristics identified for A1.

(B2) According to some implementations of the method of B1, the set of original features includes at least text-based features that describe text associated with the query and each candidate result item. Further, the supplemental feature information describes a geographical context in which the query was made.

(B3) According to some implementations of the method of any of B1-B2, the first attention-based neural network is configured to operate on: one or more instances of query embedding information associated with the query; and one or more instances of instances of result embedding information associated with each candidate result item.

(B4) According to some implementations of the method of B3, the first attention-based neural network generates preliminary output results. Further, the first attention-based neural network generates the plurality of instances of query-to-result similarity information by generating an element-by-element difference of the preliminary output results and the one or more instances of query embedding information.

(B5) According to some implementations of the method of any of B1-B4, the second attention-based neural network is configured to: map the plurality of instances of enhanced similarity information to a plurality of respective instances of projected feature information; perform self-attention on the plurality of instances of projected feature information to generate a plurality of respective instances of attention feature information; and combine (e.g., by concatenation) the plurality of instances of projected feature information with the plurality of instances of attention feature information to respectively generate the plurality of instances of result-to-result context information.

(C1) Other implementations of the technology described herein include a method (e.g., the process 702) that includes obtaining (e.g., in block 704) a query and a plurality of candidate result items that match the query, the query having one or more tokens, and each candidate result item having one or more tokens. The method further includes generating (e.g., in block 706), using a first attention-based neural network (e.g., the first attention-based neural network 126), a plurality of instances of query-to-result similarity information respectively corresponding to the plurality of candidate result items, each instance of query-to-result similarity information expressing an extent of attention that each token of the query should pay to each token of a particular candidate result item. The first attention-based neural network generates preliminary output results. Further, the first attention-based neural network generates the plurality of instances of query-to-result similarity information by generating an element-by-element difference of the preliminary output results and one or more instances of query embedding information produced from the query. The method further includes generating (e.g., in block 708) plural ranking scores based on the plurality of instances of query-to-result information, the plural ranking scores identifying an order of relevance of the plurality of candidate result items to the query. C1 shares the technical characteristics identified for A1 and A7.

(C2) According to some implementations of the method of C1, the first attention-based neural network uses a set of original text-based and structure-based features to describe the query and the plurality of candidate result items. The query-to-result information generated by the first attention-based neural network is original query-to-result information. Further, processing performed by the generation of the plural ranking scores includes: combining (e.g., in block 804 of FIG. 8) the plurality of instances of original query-to-result similarity information with supplemental feature information pertaining to a geographical context in which the query was made, to generate a plurality of respective instances enhanced similarity information; generating (e.g., in block 806), using a second attention-based neural network (e.g., the second attention-based neural network 132), a plurality of instances of result-to-result context information using self-attention, each instance of result-to-result context information expressing an extent of attention that a particular instance of enhanced similarity information should pay to other instances of enhanced similarity information; and mapping (e.g., in block 808), using a scoring neural network (e.g., the scoring neural network 134), the plurality of instances of result-to-result context information into the plural respective ranking scores.

In yet another aspect, some implementations of the technology described herein include a computing system (e.g., computing system 1002) for ranking a plurality of candidate result items in response to a query. The computing system includes hardware logic circuitry that is configured to perform any of the methods described herein (e.g., methods A1-13, B1-B6, and C1-C2).

In yet another aspect, some implementations of the technology described herein include a computer-readable storage medium for storing computer-readable instructions. The computer-readable instructions, when executed by one or more hardware processors, perform any of the methods described herein (e.g., methods A1-13, B1-B6, and C1-C2). The computer-readable instructions can also implement the first attention-based neural network, the second attention-based neural network, and the scoring neural network.

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuity 1014 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific

What is claimed is:

1. A method, using one more computing devices, for ranking a plurality of candidate result items in response to a query, comprising:
 obtaining the query and the plurality of candidate result items that match the query, the query comprising one or more tokens, and each candidate result item comprising a plurality of tokens;
 generating, using a first attention-based neural network, a plurality of instances of query-to-result similarity information respectively corresponding to the plurality of candidate result items, each instance of query-to-result similarity information being generated by determining an extent of attention that each token of the query should pay to each token of a particular candidate result item;
 generating, using a second attention-based neural network of a ranking subsystem that performs listwise inference, plural ranking scores based on the plurality of instances of query-to-result similarity information, the plural ranking scores identifying an order of relevance of the plurality of candidate result items to the query, the second attention-based neural network generating the plural ranking scores by generating a plurality of instances of result-to-result context information using self-attention based on the plurality of instances of query-to-result similarity information generated by token processing performed by the first attention-based neural network, each instance of result-to-result context information being generated by determining an extent of attention that a particular instance of query-to-result similarity information should pay to other instances of query-to-result similarity information; and
 identifying at least a top-ranking candidate result item to be presented to a user based on the plural ranking scores.

2. The method of claim 1,
 wherein the first attention-based neural network uses a set of original features to describe the query and the plurality of candidate result items,
 wherein the plurality of instances of query-to-result similarity information generated by the first attention-based neural network are instances of original query-to-result similarity information,
 wherein processing performed by the ranking subsystem comprises:
 combining the plurality of instances of original query-to-result similarity information with supplemental feature information, to generate a plurality of respective instances of enhanced similarity information; and
 mapping, using a scoring neural network, the plurality of instances of result-to-result context information into the plural respective ranking scores.

3. The method of claim 2, wherein the set of original features includes at least text-based features that describe text associated with the query and each candidate result item.

4. The method claim 3, wherein the set of original features also includes at least structure-based features that describe structural composition of the query and each candidate result item.

5. The method of claim 1, wherein the first attention-based neural network operates on: one or more instances of query embedding information associated with the query; and one or more instances of result embedding information associated with each candidate result item.

6. The method of claim 5, wherein the method generates said one or more instances of query embedding information by:
 identifying said one or more tokens of the query, to overall generate one or more instances of query token information;
 identifying a type associated which each token of the query, to overall generate one or more instances of query type information;
 mapping said one or more instances of query token information to respective one or more query token embeddings;
 mapping said one or more instances of query type information to respective one or more query type embeddings; and
 combining said one or more query token embeddings and said one or more query type embeddings to generate said one or more instances of query embedding information.

7. The method of claim 5, wherein the first attention-based neural network generates preliminary output results, and wherein the first attention-based neural network generates the plurality of instances of query-to-result similarity information by generating element-by-element differences between the preliminary output results and said one or more instances of query embedding information.

8. The method of claim 7, wherein the first attention-based neural network forms each instance of query-to-result similarity information for a particular pairing of the query and a specified candidate result item by summing a square of the differences associated with the particular pairing.

9. The method of claim 2, wherein the supplemental feature information includes a geographical context in which the query was made.

10. The method of claim 9, wherein the geographical context is based on a consideration of a position associated with the user who submitted the query.

11. The method of claim 9, wherein the geographical context is based on a consideration of a portion of a digital map specified by the user.

12. The method of claim 2, wherein the second attention-based neural network operates by:
 mapping the plurality of instances of enhanced similarity information to a plurality of respective instances of projected feature information;
 performing self-attention on the plurality of instances of projected feature information to generate a plurality of respective instances of attention feature information; and
 combining the plurality of instances of projected feature information with the plurality of instances of attention feature information to respectively generate the plurality of instances of result-to-result context information.

13. The method of claim 2, wherein the scoring neural network includes at least two or more fully-connected neural network layers.

14. The method of claim 1, wherein said at least top-ranking candidate result item is presented as an advertisement.

15. The method of claim 1, wherein said at least top-ranking candidate result item is presented as a product suggestion.

16. The method of claim 1, wherein, for other candidate result items, each candidate result item has a single token.

17. The method of claim 1, wherein each candidate result item includes features of different respective types.

18. The method of claim 2, wherein the supplemental information includes plural instances of added feature information added to the respective plurality of instances of respective original query-to-result similarity information.

19. A computing system for ranking a plurality of candidate result items in response to a query, the query comprising one or more tokens, and each candidate result item comprising a plurality of tokens, the computing system comprising:
hardware logic circuitry that implements a first attention-based neural network, a second attention-based neural network, and a scoring neural network,
the first attention-based neural network being configured to generate a plurality of instances of original query-to-result similarity information respectively corresponding to the plurality of candidate result items, each instance of original query-to-result similarity information being generated by determining an extent of attention that each token of the query should pay to each token of a particular candidate result item;
the first attention-based neural network being configured to use a set of original features to describe the query and the plurality of candidate result items,
the plurality of instances of original query-to-result similarity information being combined with supplemental feature information, to generate a plurality of respective instances of enhanced similarity information;
the second attention-based neural network being configured to use listwise inference to generate a plurality of instances of result-to-result context information using self-attention based on the plurality of instances of enhanced similarity information that express, in part, an outcome of processing performed by the first attention-based neural network, each instance of result-to-result context information being generated by determining an extent of attention that a particular instance of enhanced similarity information should pay to other instances of enhanced similarity information; and
the scoring neural network being configured to map the plurality of instances of result-to-result context information into plural respective ranking scores, the plural ranking scores identifying an order of relevance of the plurality of candidate result items to the query.

20. The computing system of claim 19, wherein the set of original features includes at least text-based features that describe text associated with the query and each candidate result item, and wherein the supplemental feature information describes a geographical context in which the query was made.

21. The computing system of claim 19, wherein the first attention-based neural network is configured to operate on: one or more instances of query embedding information associated with the query; and one or more instances of result embedding information associated with each candidate result item.

22. The computing system of claim 21, wherein the first attention-based neural network generates preliminary output results, and wherein the first attention-based neural network generates the plurality of instances of query-to-result similarity information by generating element-by-element differences between the preliminary output results and said one or more instances of query embedding information.

23. The computing system of claim 19, wherein the second attention-based neural network is configured to:
map the plurality of instances of enhanced similarity information to a plurality of respective instances of projected feature information;
perform self-attention on the plurality of instances of projected feature information to generate a plurality of respective instances of attention feature information; and
combine the plurality of instances of projected feature information with the plurality of instances of attention feature information to respectively generate the plurality of instances of result-to-result context information.

24. A computer-readable storage medium for storing computer-readable instructions, one or more hardware processors executing the computer-readable instructions to perform a method that comprises:
obtaining a query and a plurality of candidate result items that match the query, the query comprising one or more tokens, and each candidate result item comprising a plurality of tokens;
generating, using a first attention-based neural network implemented by the computer-readable instructions, a plurality of instances of query-to-result similarity information respectively corresponding to the plurality of candidate result items, each instance of query-to-result similarity information being generated by determining an extent of attention that each token of the query should pay to each token of a particular candidate result item,
wherein the first attention-based neural network generates preliminary output results having a plurality of elements, and wherein the first attention-based neural network generates the plurality of instances of query-to-result similarity information by generating element-by-element differences between the preliminary output results and query embedding information produced from the query; and
generating plural ranking scores based on the plurality of instances of query-to-result similarity information generated by token processing performed by the first attention-based neural network, the plural ranking scores identifying an order of relevance of the plurality of candidate result items to the query.

25. The computer-readable storage medium of claim 24, wherein the first attention-based neural network uses a set of original text-based and structure-based features to describe the query and the plurality of candidate result items,
wherein the query-to-result similarity information generated by the first attention-based neural network is original query-to-result similarity information,
wherein processing performed by said generating plural ranking scores comprises:
combining the plurality of instances of original query-to-result similarity information with supplemental feature information including a geographical context in which the query was made, to generate a plurality of respective instances enhanced similarity information;
generating, using a second attention-based neural network implemented by the computer-readable instructions, a plurality of instances of result-to-result context information using self-attention, each instance of result-to-result context information being generated by determining an extent of attention that a particular instance of enhanced similarity information should pay to other instances of enhanced similarity information; and
mapping, using a scoring neural network implemented by the computer-readable instructions, the plurality of instances of result-to-result context information into the plural respective ranking scores.

* * * * *